US008274701B2

(12) United States Patent
Seibt

(10) Patent No.: US 8,274,701 B2
(45) Date of Patent: Sep. 25, 2012

(54) HIGH SPEED PRINTING SYSTEM FOR PRINTING MAGNETIC INK

(75) Inventor: John Seibt, Sanger, TX (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 762 days.

(21) Appl. No.: 12/464,526

(22) Filed: May 12, 2009

(65) Prior Publication Data

US 2010/0289844 A1 Nov. 18, 2010

(51) Int. Cl.
*B41J 2/21* (2006.01)
*G06K 1/00* (2006.01)

(52) U.S. Cl. .......... 358/1.9; 358/1.4; 358/1.8; 358/3.28; 358/1.18; 399/366; 347/115; 347/240

(58) Field of Classification Search .................. 358/1.4, 358/1.8, 1.9, 3.28, 1.18, 515, 518; 347/15, 347/115, 117, 232, 240; 399/49, 232, 341, 399/366

See application file for complete search history.

(56) References Cited

U.S. PATENT DOCUMENTS 4,901,114 A * 2/1990 Parker et al. .................. 399/232
4,980,719 A * 12/1990 Allen et al. ....................... 399/3
5,697,012 A * 12/1997 Sasanuma et al. .............. 399/49
6,328,405 B1 12/2001 Weber et al.
6,467,896 B2 10/2002 Meyer et al.
6,705,702 B2 3/2004 Gunther et al.
6,761,429 B2 7/2004 Su et al.
6,814,426 B2 11/2004 Doll et al.
7,147,301 B2 12/2006 Powers et al.
7,283,150 B2 * 10/2007 Sharma et al. ................ 347/240
8,101,326 B2 * 1/2012 Morgan et al. ............. 430/45.51
2005/0270364 A1 * 12/2005 Sharma et al. ................ 347/232
2006/0176350 A1 8/2006 Howarth et al.
2006/0268316 A1 * 11/2006 Condon et al. ............... 358/1.15
2007/0139733 A1 6/2007 Mizes et al.
2008/0217416 A1 * 9/2008 Lin et al. ....................... 235/493
2009/0109510 A1 * 4/2009 Varga ........................... 358/538
2010/0104336 A1 * 4/2010 Christopher et al. ......... 399/341

* cited by examiner

*Primary Examiner* — Kimberly A Williams
(74) *Attorney, Agent, or Firm* — Duft Bornsen & Fishman, LLP

(57) ABSTRACT

High speed printing system for printing magnetic ink systems and associated methods are disclosed. A color of the magnetic ink may be designed to resemble one of the non-magnetic inks so that instead of ejecting the one non-magnetic ink, the printing system ejects the magnetic ink. Nozzles in a printhead may also be arranged to be adjacent to each other and may be appropriately spaced without causing the inks to be mixed in the printhead. Additionally, a color transform system may be provided to transform a sheet image in accordance with ejecting at least the magnetic and the non-magnetic ink from the printhead.

17 Claims, 4 Drawing Sheets

HIGH SPEED PRINTING SYSTEM FOR PRINTING MAGNETIC INK

BACKGROUND

1. Field of the Invention

The invention is related to the field of printing systems, and in particular, to a high speed printing system for printing magnetic ink.

2. Statement of the Problem

Magnetic Ink Character Recognition ("MICR") is a technology that allows a machine to read characters printed on a print medium. For example, the bottom line of a check is typically printed using a MICR ink so that the check can be processed automatically by a machine. Traditionally, a magnetic ink is printed using an offset printing press in which an inked image (that has the magnetic ink) is first transferred/offset to a rubber blanket, and then from the rubber blanket to paper. Many types of document production have recently moved to using high speed printing systems that are more customizable than the offset printing press. Such high speed printing systems usually use inkjet technologies to produce full colored documents.

Full colored documents are typically produced using inkjet technologies by ejecting varying amounts of inks of four colors: cyan, magenta, yellow, and black. Either dye-based inks or pigment-based inks are usually used. Meanwhile, a magnetic ink used for MICR printing is usually a hybrid ink with dye colorant and ferrite particles. However, it is generally believed that inks of different types should not be mixed. A dye-based ink has dye colorant, while a pigment-based ink has colored particles. Mixing them may cause undesired chemical reactions and/or plug up the nozzles (a printhead has a number of nozzles for ejecting ink from the printhead onto paper).

To reduce the possibility of mixing the magnetic ink with another ink, the magnetic ink is usually ejected from an additional printhead that is separate from the printhead(s) used for regular color printing. However, adding an additional printhead adds complexities to the printing systems, which is not desirable. Some high speed printing systems also use a series of printheads arranged in a column so that a large area of the print medium can be covered simultaneously. Retrofitting such high speed printing systems is even more difficult and costly because a series of printheads for printing the magnetic ink would need to be added.

Additionally, these high speed printing systems may eject inks of more than one color concurrently from each printhead to speed up printing. However, as more than one ink is ejected from each printhead with possible mixing of the inks, it is generally believed that all inks need to be switched to the same pigment-based type because the magnetic ink, with its ferrite particles, is more akin to a pigment-based ink. However, it would not be practical to completely switch from a dye-based printing system to a pigment-based printing system whenever the printing system needs to print the magnetic ink.

SUMMARY

Embodiments provided herein enable a high speed printing system in which printing a magnetic ink does not cause undesired chemical reactions and do not plug up the nozzles more than printing non-magnetic inks. A color of the magnetic ink may be designed to resemble one of the non-magnetic inks so that instead of ejecting the non-magnetic ink, the printing system ejects the magnetic ink. For example, a color of the magnetic ink may resemble black and the printing system ejects the magnetic ink instead of a black ink. Thus, no additional printhead needs to be added to print the magnetic ink. Additionally, nozzles in a printhead may be arranged to be adjacent to each other and may be appropriately spaced. Accordingly, a magnetic ink and a non-magnetic ink may be ejected from adjacent nozzles of the single printhead without causing the inks to be mixed in the printhead. The non-magnetic ink may thus remain as a dye-based ink (or be switched to a pigment-based ink if a customer so chooses).

The color of the magnetic ink may not exactly match the non-magnetic version. Accordingly, a color transform system may be provided to transform a sheet image in accordance with ejecting the magnetic and the non-magnetic ink from the single printhead. One embodiment comprises a printing system that includes the color transform system. The color transform system is operable to transform a sheet image to generate a first bitmap for printing magnetic ink and a second bitmap for printing non-magnetic ink in accordance with ejecting, from a single printhead, the magnetic ink and the non-magnetic ink. The printing system also includes the single printhead operable to receive the first bitmap and the second bitmap, and to concurrently eject the magnetic ink based on the first bitmap and the non-magnetic ink based on the second bitmap.

Other embodiments may be provided below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
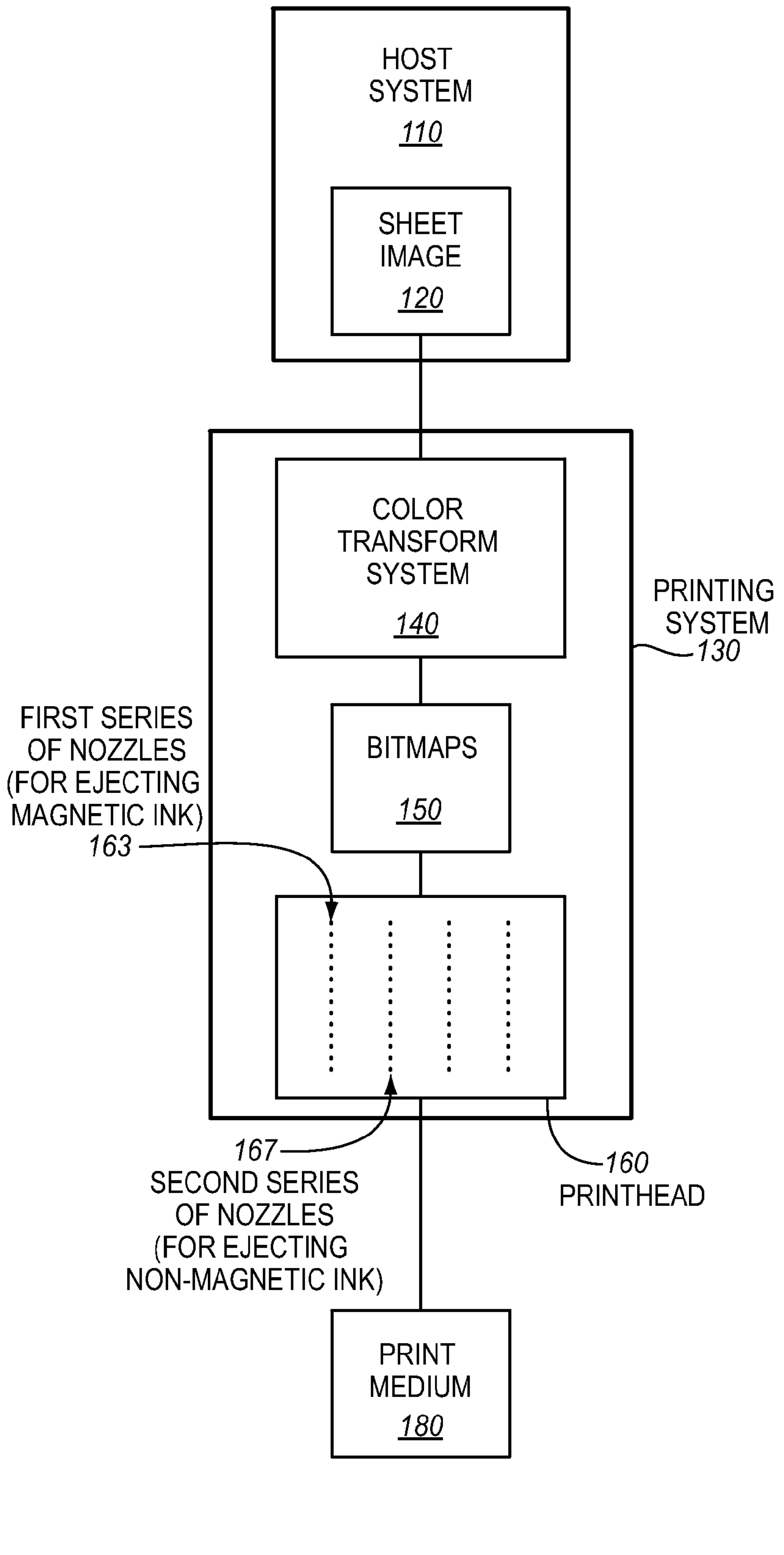
FIG. 1 is a block diagram illustrating a printing system in an exemplary embodiment.

FIG. 1 is a block diagram illustrating a printing system 130 in an exemplary embodiment. A host system 110 is in communication with the printing system 130 to print a sheet image 120 onto a print medium 180. Part of the sheet image 120 is printed using a magnetic ink. For example, the resulting print medium 180 may include a check with a MICR line (i.e., the bottom line of a check) that is printed using the magnetic ink so that the MICR line is readable by a machine.

The resulting print medium 180 may be printed in color or in any of a number of gray or black-and-white shades.

The host system 110 may comprise any computing device including a personal computer or a server. The sheet image 120 may comprise any file or data that describes how an image on a sheet of print medium should be printed. For example, the sheet image 120 may comprise PostScript data, Printer Command Language ("PCL") data, and/or any other printer language data. The printing system 130 may comprise a high-speed printer. The high-speed printer may be operable for volume printing including printing at least 100 pages per minute. The print medium 180 may comprise continuous form paper, cut sheet paper, and/or any other medium suitable for printing.

The printing system 130, in one generalized form, include a printhead 160 that includes a number of nozzles, jets, and/or any other similar element for ejecting ink or another substance onto the print medium 180. The printhead 160 may include at least one nozzle plate on which holes or orifices are formed as openings through which the ink exits from the nozzles of the printhead 160. For example, the single printhead 160 may includes a first series of nozzles 163 (for ejecting magnetic ink), a second series of nozzles 167 (for ejecting non-magnetic ink), and/or other nozzles (e.g., for also ejecting the magnetic ink and/or the non-magnetic ink). A nozzle for ejecting the magnetic ink and a nozzle for ejecting the non-magnetic ink may each have an opening on a single nozzle plate of the printhead 160. It is noted that the word "single" (e.g., as in the "single" printhead 160) is denoted to mean that the printhead by itself can eject the magnetic ink and the non-magnetic ink. The word "single" does not imply that a printing system includes only one printhead. Rather, the printing system may include multiple printheads and each printhead by itself can eject the two inks.

When the print medium 180 is passed underneath or near a nozzle, an ink droplet can be ejected from the nozzle to be deposited onto the print medium 180, thus printing a dot on the print medium 180. Using a series of nozzles speeds up printing by ejecting a number of ink droplets onto the print medium 180 concurrently. Having multiple series of nozzles further speeds up printing by ejecting ink droplets of different colors and/or characteristics concurrently. To avoid undesired mixing of inks, nozzles (and/or nozzle openings on the nozzle plate) of each series may be arranged to be adjacent to each other and may be appropriately spaced. Additionally, a distance between the nozzle plate (having the nozzle openings) and the print medium 180 may also be appropriately spaced so that ink droplets do not intermix after they are ejected. After the ink droplets are ejected, they may be absorbed into the print medium 180 and dry almost instantly without any mixing due to having low moisture/water content.

One or more bitmaps 150 may be generated to indicate which nozzle should eject an ink droplet at what time. For example, a particular bitmap may be generated to indicate that a dot should be printed at a particular coordinate. When the print medium 180 passes underneath or near a nozzle such that ejecting an ink droplet from the nozzle would be deposited at the particular coordinate, the ink droplet would be caused to be ejected from the nozzle. The bitmaps 150 may be generated using at least a color transform system 140. The color transform system 140 may comprise any system, device, software, circuitry and/or other suitable component operable to transform the sheet image 120 for generating the bitmaps 150 in accordance with ejecting at least a magnetic and a non-magnetic ink from the printhead 160. The color transform system 140 may comprise part of a print controller of the printing system 130, part of a printhead controller for the printhead 160, and/or any other portion of the printing system 130. In some embodiments, the color transform system 140 may also comprise part of the host system 110.

Figure 2:
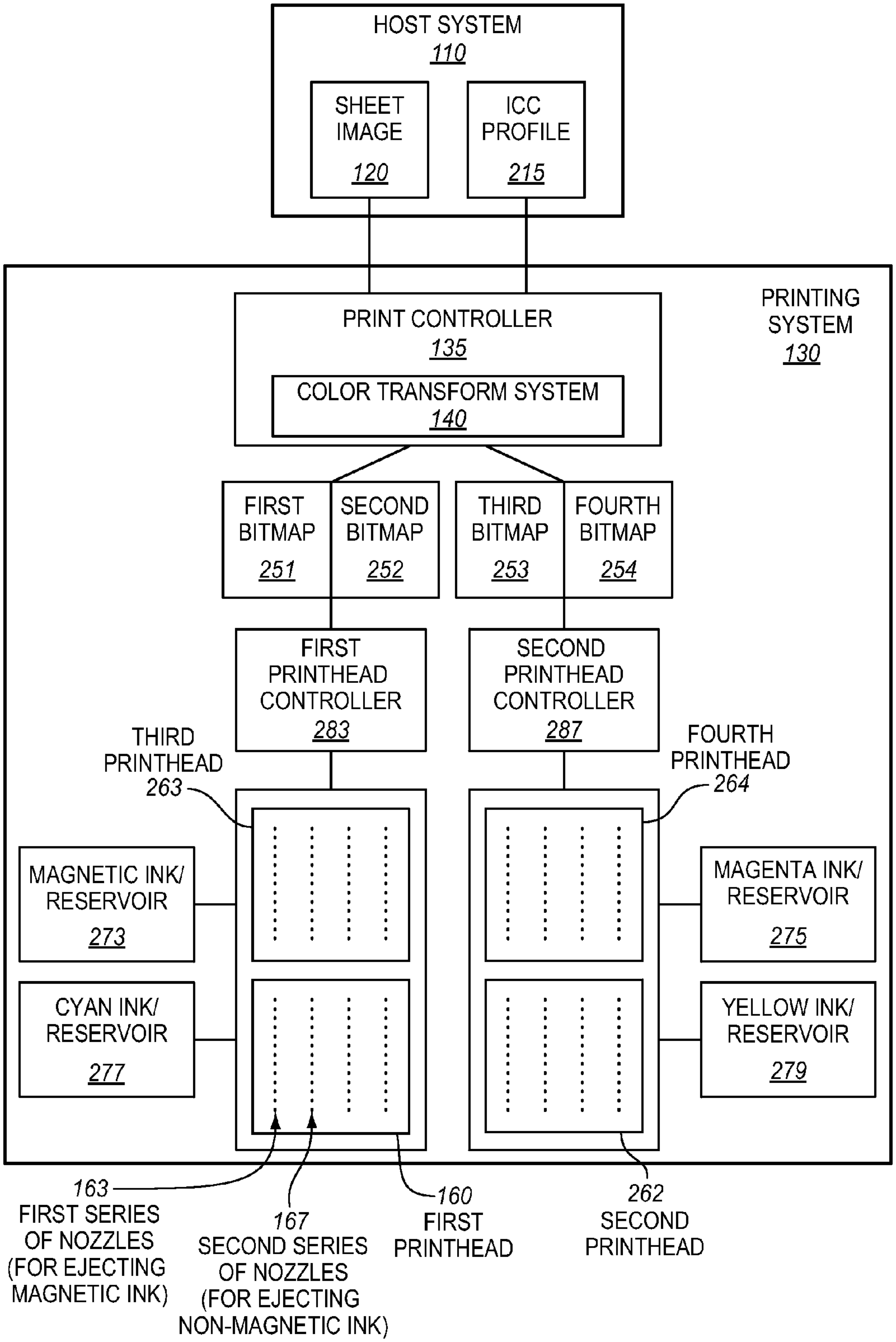
FIG. 2 is a block diagram illustrating the printing system in another exemplary embodiment.

The printing system 130 may comprise additional components to enable high-speed color printing. FIG. 2 is a block diagram illustrating the printing system 130 in another exemplary embodiment. The host system 110 is still in communication with the printing system 130 to print the sheet image 120. In addition to the (first) printhead 160, the printing system 130 may include a second printhead 262 for ejecting inks of additional colors and/or characteristics. To further speed up printing, the printing system 130 may also include a third printhead 263 that is arranged in an array (e.g., arranged along a length of the print medium 180) with the first printhead 160. The first series of nozzles 163 of the first printhead 160 may thus eject ink droplets concurrently with nozzles of the third printhead 263 to cover an even larger area of the print medium 180. Similarly, the printing system 130 may further include a fourth printhead 264 arranged in an array with the second printhead 262 so that nozzles of both printheads may eject ink droplets concurrently.

The array formed by the first printhead 160 and the third printhead 263 may be operable to print a magnetic ink and a cyan ink. The magnetic ink may be supplied from a magnetic ink reservoir 273 storing a magnetic ink such that the magnetic ink reservoir 273 is coupled with at least a nozzle of the first series of nozzles 163 (for ejecting magnetic ink). Similarly, the cyan ink may be supplied from a cyan ink reservoir 277 such that the cyan ink reservoir 277 is coupled with at least a nozzle of the second series of nozzles 167 (for ejecting the non-magnetic cyan ink). To speed up printing, each of the first printhead 160 and the third printhead 263 may include another series of nozzles for printing the magnetic ink and yet another series of nozzles for printing the cyan ink. The series of nozzles may be adjacent to each other and may be interlaced with appropriate spacing between each other. Because of the appropriate spacing, inks do not intermix after they are ejected even though it is generally believed that inks of different types should not be ejected from a single printhead.

The array formed by the second printhead 262 and the fourth printhead 264 may be operable to print a magenta ink and a yellow ink. The magenta ink may be supplied from a magenta ink reservoir 275 storing a magenta ink such that the magenta ink reservoir 275 is coupled with a least a nozzle of the second printhead 262 and the fourth printhead 264. Similarly, the yellow ink may be supplied from a yellow ink reservoir 279 storing a yellow ink such that the yellow ink reservoir 279 is coupled with at least a nozzle of the second printhead 262 and the fourth printhead 264. A color of the magnetic ink may resemble black and the first printhead 160 and the third printhead 263 eject the magnetic ink instead of a black ink. The printing system 130 is thus capable of printing inks of four colors (cyan, magenta, yellow, and black) while also being capable of printing the magnetic ink without adding additional printheads.

The magnetic ink may include dye colorant and ferrite particles and may be suitable for MICR printing. Among a wide variety of possible formulations, the magnetic ink may include color pigments and ferrite particles. The ferrite particles may be smaller than colored particles (of a pigment-based ink). Each of the non-magnetic inks (e.g., cyan, magenta, and yellow) may include one of a pigment-based ink with colored particles and a dye-based ink with dye colorant. In other words, the non-magnetic inks may be all dye-based, all pigment-based, or a mix of the two.

In some embodiments, the magnetic ink may resemble another color (i.e., a color other than black). Accordingly, rather than ejecting the other color, the magnetic ink would be ejected without adding additional printheads. In another embodiment, the printing system 130 may also be able to print inks of other colors and/or other characteristics. For example, the color model may be extended to CcMmYK to include light cyan and light magenta inks. Additionally, the ink or the substance printed may be ultraviolet or may reflect another wavelength not visible to the human eye. Besides pigment-based ink and dye-based ink, the ink or the substance printed may be of yet another characteristic. For example, the ink or the substance may include both dye-colorant and colored particles. Indeed, the printing system 130 is not limited to printing the magnetic ink. Rather, the printing system 130 is capable of printing inks or substances of different characteristics from a single printhead (and/or a single nozzle plate) even though it is generally believed that inks of different types should not be ejected from a single printhead.

Because a color of the magnetic ink (or another ink or substance to be printed) may not exactly match the non-magnetic version (or the original ink replaced by the magnetic ink), the printing system 130 also comprises the color transform system 140 operable to transform the sheet image 120 in accordance with printing the magnetic ink (or the another ink or substance). The color transform system 140 may comprise part of a print controller 135. The print controller 135 may comprise any system, device, software, circuitry and/or other suitable component operable to interpret, render, rasterize, and/or otherwise convert the sheet image 120 into the bitmaps 150 for printing. For example, the bitmaps 150 may comprise a first bitmap 251, a second bitmap 252, a third bitmap 253, and a fourth bitmap 254. The first bitmap 251 and the second bitmap 252 may be generated by the print controller 135 and sent to a first printhead controller 283 to be printed using the array of the first printhead 160 and the third printhead 263. Similarly, the third bitmap 253 and the fourth bitmap 254 may be generated by the print controller 135 and sent to a second printhead controller 287 to be printed using the array of the second printhead 262 and the fourth printhead 264.

The four bitmaps may each indicate that dots of a particular color should be printed at particular coordinates. For example, the first bitmap 251 may indicate that black dots should be printed at particular coordinates, and the magnetic ink (which may be black) would be ejected at the particular coordinates. The second bitmap 251 may be used for printing cyan dots. Similarly, the third bitmap 253 may be used for printing magenta dots and the fourth bitmap 254 may be used for printing yellow dots. Accordingly, each of the first printhead controller 283 and the second printhead controller 287 may comprise any system, device, software, circuitry and/or other suitable component operable to receive the bitmaps (251, 252, 253, 254) and control nozzles of the printheads (160, 262, 263, 264) for ejecting inks based on the bitmaps. It is noted that a printhead may sometimes be seen as including a printhead controller in some embodiments. For example, the (first) printhead controller 160 in the embodiment of FIG. 1 may be seen as including a printhead controller.

The color transform system 140 may process an International Color Consortium ("ICC") profile 215 in order to transform the sheet image 120. The ICC profile 215 may be sent from the host system 110 in conjunction with sending the sheet image 120. The ICC profile 215 may also be stored within the printing system and may be selected when the printing system 130 is administered/configured to print the magnetic ink. The ICC profile 215 comprises a set of data characterizing the printing system 130 for printing the magnetic ink (and the remaining colors) in accordance with standards promulgated by the International Color Consortium ("ICC"). The ICC profile 215 may have been provided by a manufacturer of the printing system 130 and/or a provider of the magnetic ink printing solution. The ICC profile 215 may have been provided using a computer readable medium and/or otherwise distributed electronically (e.g., downloaded over a network).

Figure 3:
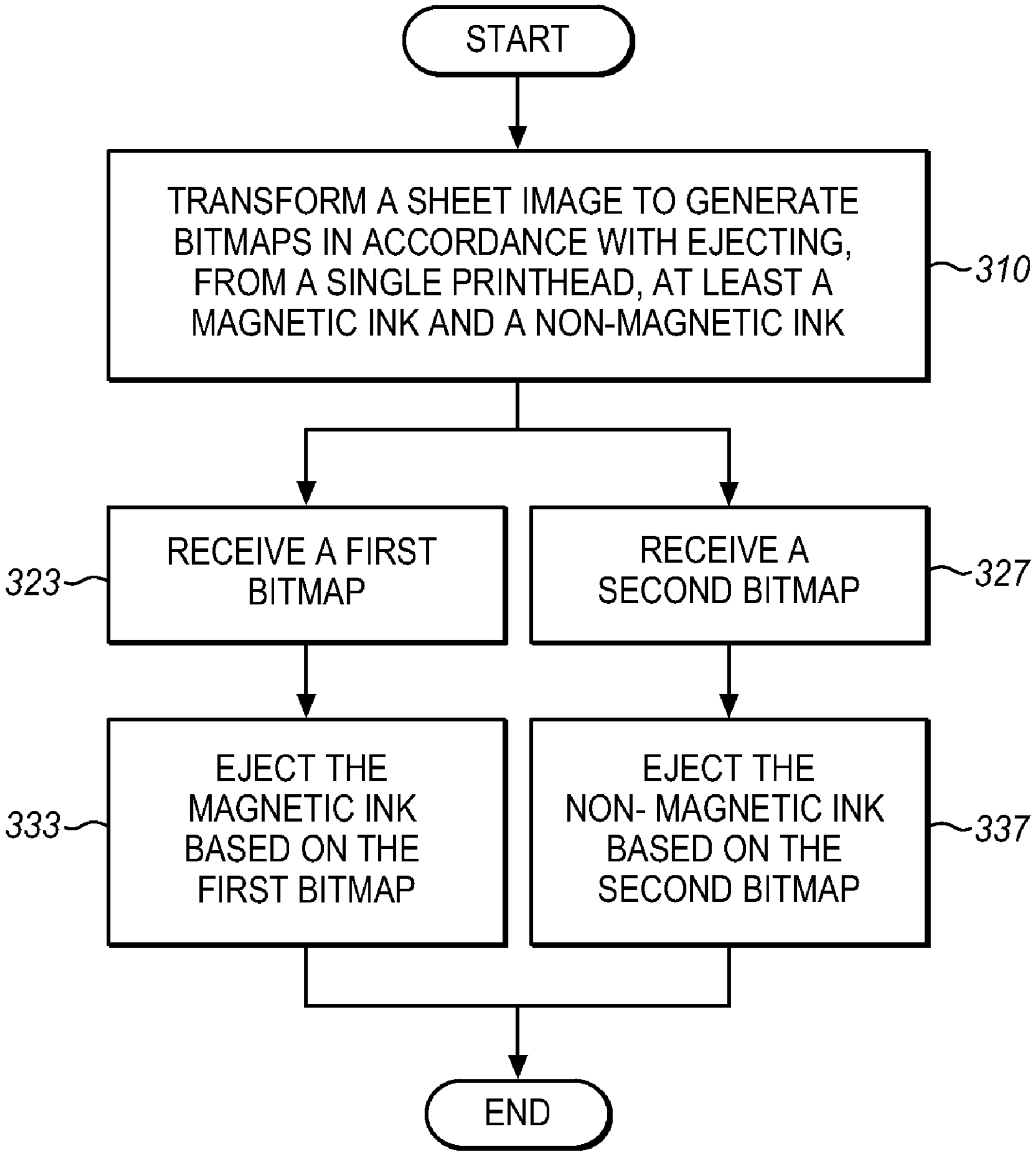
FIG. 3 is a flow chart illustrating a method of printing magnetic ink in an exemplary embodiment.

As noted above, a color of the magnetic ink may not exactly match the non-magnetic version. However, the color transform system 140 is operable to adjust the bitmap(s) for printing the magnetic ink such that the resulting print medium 180 may still appear as though it has been printed with the original non-magnetic ink. FIG. 3 is a flow chart illustrating a method of printing magnetic ink in an exemplary embodiment. The steps of the flow chart in FIG. 3 are not all inclusive and may include other steps not shown. The host system 110 has sent the sheet image 120 to the printing system 130. In step 310, the color transform system 140 transforms the sheet image 120 to generate bitmaps 150. For example, the color transform system 140 (and/or other components of the print controller 135) may be operable to generate the first bitmap 251 for printing the magnetic ink and the second bitmap 252 for printing the non-magnetic ink (e.g., the cyan ink). The two bitmaps are generated in accordance with ejecting at least the magnetic ink and the non-magnetic ink from the single first printhead 160 (and the single third printhead 263).

It is noted that the magnetic ink has replaced another non-magnetic ink so that the printing system 130 ejects the magnetic ink instead of the other non-magnetic ink. However, a color of the magnetic ink may not exactly match the other non-magnetic ink. For example, the other non-magnetic ink may resemble black, but the magnetic ink may not be of the same black color (e.g., the magnetic ink may appear more reddish because of the ferrite particles). Generating the bitmaps using the color space that corresponds with the other non-magnetic ink would produce a resulting print medium 180 that does not match the intended color(s). Thus, the color transform system 140 may be operable to compensate for a difference between a color of the magnetic ink and a color of another non-magnetic ink in some embodiments. In one embodiment, the color transform system 140 may increase the density of dots to be printed using the magnetic ink to better match black. Alternatively or in addition, the color transform system 140 may add inks of other colors (e.g., one or more of cyan, magenta, and yellow) to a dot printed with the magnetic ink to better match black in another embodiment. In yet another embodiment, the color transform system 140 may alternatively or additionally vary a size of ink droplets.

In other embodiments, the color transform system 140 may be operable to separate a particular color plane from the sheet image 120. For example, the magnetic ink may resemble black, and the color transform system 140 would separate a black color plane from the sheet image 120 in order to generate the first bitmap 251 for printing the magnetic ink. Magnetic ink would then be printed based at least on the first bitmap 251 that corresponds with the black plane. If the magnetic ink is of another color, the color transform system 140 would generate a corresponding bitmap by separating the color plane of the other color. As noted above, in some embodiments the color transform system 140 may add inks of other colors (e.g., one or more of cyan, magenta, and yellow) to a dot printed with the magnetic ink to better match black. The color transform system 140 may thus generate the bitmap of another color (e.g., the second bitmap 252 for cyan) based on color planes of both black and the other color (e.g., both the black color plane and cyan color plane).

In some embodiments, the color transform system 140 is further operable to transform the sheet image 120 based on the ICC profile 215 that corresponds with at least the magnetic ink. For example, the color transform system 140 may process the ICC profile 215 to compute a transformation from a profile connection space ("PCS") into a color space that corresponds with the magnetic ink. The transformation is different from another transformation that the color transform system 140 would compute for another ICC profile that corresponds with another ink that the magnetic ink replaces.

After generating the bitmaps (251, 252, 253, 254) based on operations of the color transform system 140, the print controller 135 sends the bitmaps to the printhead controllers (283, 287) to be received by the printheads and/or the printhead controllers. In step 323, the first printhead controller 283 may receive the first bitmap 251. In step 327, the first printhead controller 283 may receive the second bitmap 252. It is noted that the first printhead controller 283 may receive the bitmaps in parallel or sequentially, and the bitmaps may be received through a proprietary bus/communication channel and/or one that is standard-based including IEEE 1394 and Universal Serial Bus ("USB"). Additionally, as noted above, a printhead may sometimes be seen as including a printhead controller in some embodiments. Accordingly, when such a printhead receives a bitmap, the bitmap may more specifically be received by a printhead controller of the printhead to cause nozzles of the printhead to eject ink.

In step 333, the first printhead controller 283 may cause the magnetic ink to be ejected based on the first bitmap 251. For example, the first printhead controller 283 may control the first series of nozzles 163 (for ejecting magnetic ink) of the first printhead 160 based on a portion of the first bitmap 251, and control another series of nozzles (also for ejecting magnetic ink) of the third printhead 263 based on another portion of the first bitmap 251. These nozzles would cover different areas of the print medium 180 as indicated by the first bitmap 251. Similarly, in step 337, the printhead controller 283 may cause the non-magnetic cyan ink to be ejected based on the second bitmap 252.

The remaining colors may be printed in a like manner. For example, the color transform system 140 may also transform the sheet image 120 to generate the third bitmap 253 for printing the magenta ink and the fourth bitmap 254 for printing the yellow ink. The print controller 135 then sends the third bitmap 253 and the fourth bitmap 254 to be received by the second printhead controller 287. The second controller 287 then causes the second printhead 262 and the fourth printhead 264 to eject the magenta ink based on the third bitmap and the yellow ink based on the fourth bitmap.

In another embodiment, the front side of a sheet may be printed with the magnetic ink, while the back side of the sheet may be printed with non-magnetic/regular black ink. The sheet image 120 may thus comprise a front sheet image, and the host system 110 may also send a back sheet image to the printing system 130. The printing system 130 transforms the back sheet image for printing in accordance with ejecting the non-magnetic/regular black ink. Accordingly, to transform the front sheet image, the color transform system 140 would compensate for a difference between a color of the magnetic ink and a color of the non-magnetic/regular black ink.

Figure 4:
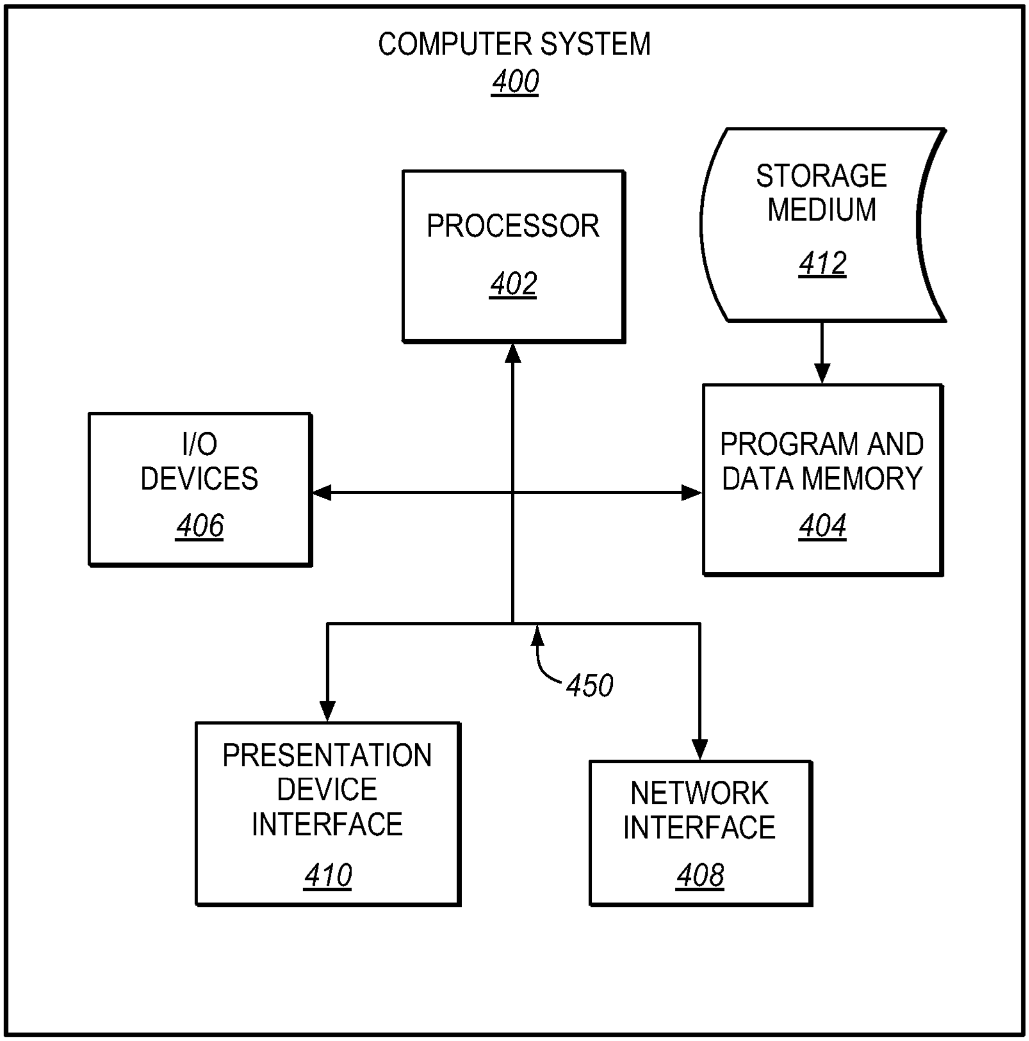
FIG. 4 illustrates a computer system operable to execute computer readable medium embodying programmed instructions to perform desired functions in an exemplary embodiment.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 4 is a block diagram depicting a computer system 400 operable to provide features and aspects hereof by executing programmed instructions and accessing data stored on a computer readable storage medium 412.

Furthermore, embodiments of the invention can take the form of a computer program product accessible from a computer-usable or computer-readable medium 412 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A computer system 400 suitable for storing and/or executing program code will include at least one processor 402 coupled directly or indirectly to memory elements 404 through a system bus 450. The memory elements 404 can include local memory employed during actual execution of the program code, bulk storage, and cache memories which provide temporary storage of at least some program code and/or data in order to reduce the number of times code and/or data must be retrieved from bulk storage during execution.

Input/output or I/O devices 406 (including but not limited to keyboards, displays, pointing devices, etc) can be coupled to the system either directly or through intervening I/O controllers. Network adapter interfaces 408 may also be coupled to the system to enable the computer system 400 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 410 may be coupled to the system to interface to one or more presentation device such as printing systems and displays for presentation of presentation data generated by processor 402.

Although specific embodiments were described herein, the scope of the invention is not limited to those specific embodiments. The scope of the invention is defined by the following claims and any equivalents thereof.

I claim:

1. A printing system, comprising:

a color transform system operable to transform a sheet image to separate a black color plane from a sheet image, and to generate a first bitmap based on the black color plane for printing magnetic ink in accordance with ejecting, from a single printhead, the magnetic ink;

the color transform system further operable to transform the sheet image to generate a second bitmap for printing non-magnetic ink in accordance with ejecting, from the single printhead, the non-magnetic ink; and the single printhead operable to receive the first bitmap and the second bitmap, and to concurrently eject the magnetic ink based on the first bitmap and the non-magnetic ink based on the second bitmap.

2. The printing system of claim 1, wherein the color transform system is further operable to compensate for a difference between a color of the magnetic ink and a color of another non-magnetic ink that resembles black.

3. The printing system of claim 1, further comprising an International Color Consortium ("ICC") profile corresponding with the magnetic ink and the non-magnetic ink, wherein the color transform system is further operable to transform the sheet image based on the ICC profile.

4. The printing system of claim 1, wherein the magnetic ink is suitable for Magnetic Ink Character Recognition ("MICR") printing.

5. The printing system of claim 1, wherein the magnetic ink includes dye colorant and ferrite particles.

6. The printing system of claim 1, wherein the non-magnetic ink includes one of a pigment-based ink with colored particles and a dye-based ink with dye colorant.

7. The printing system of claim 1, wherein a color of the magnetic ink resembles black, and a color of the non-magnetic ink resembles cyan.

8. A method of printing magnetic ink, comprising:

transforming a sheet image to separate a black color plane from a sheet image;

generating a first bitmap based on the black color plane for printing magnetic ink in accordance with ejecting, from a single printhead, the magnetic ink;

transforming the sheet image to generate a second bitmap for printing non-magnetic ink in accordance with ejecting, from the single printhead, non-magnetic ink;

receiving the first bitmap and the second bitmap at the single printhead; and ejecting the magnetic ink based on the first bitmap and the non-magnetic ink based on the second bitmap concurrently.

9. The method of claim 8, further comprising:

compensating for a difference between a color of the magnetic ink and a color of another non-magnetic ink that resembles black while transforming the sheet image.

10. The method of claim 8, further comprising:

processing an International Color Consortium ("ICC") profile that corresponds with the magnetic ink and the non-magnetic ink while transforming the sheet image.

11. The method of claim 8, wherein a color of the magnetic ink resembles black, and a color of the non-magnetic ink resembles cyan, the method further comprising:

transforming the sheet image to generate at least a third bitmap for printing a magenta ink and a fourth bitmap for printing a yellow ink in accordance with ejecting, from another single printhead, the magenta ink and the yellow ink;

receiving the third and the fourth bitmap at the other single printhead; and ejecting the magenta ink based on the third bitmap and the yellow ink based on the fourth bitmap concurrently.

12. The method of claim 8, wherein the sheet image is a front sheet image and a color of the magnetic ink resembles black, the method further comprising:

transforming a back sheet image for printing in accordance with ejecting another non-magnetic ink that also resembles black in color; and compensating for a difference between a color of the magnetic ink and a color of the other non-magnetic ink while transforming the front sheet image.

13. A non-transitory computer readable medium tangibly embodying programmed instructions which, when executed by a computer system, are operable to execute a method of printing magnetic ink, the method comprising:

transforming a sheet image to separate a black color plane from a sheet image;

generating a first bitmap based on the black color plane for printing magnetic ink in accordance with ejecting, from a single printhead, the magnetic ink;

transforming the sheetside image to generate a second bitmap for printing non-magnetic ink in accordance with ejecting, from the single printhead, the the non-magnetic ink;

receiving the first bitmap and the second bitmap at the single printhead; and ejecting the magnetic ink based on the first bitmap and the non-magnetic ink based on the second bitmap concurrently.

14. The non-transitory computer readable medium of claim 13, wherein the method further comprising:

compensating for a difference between a color of the magnetic ink and a color of another non-magnetic ink that resembles black while transforming the sheet image.

15. The non-transitory computer readable medium of claim 13, wherein the method further comprising:

processing an International Color Consortium ("ICC") profile that corresponds with the magnetic ink and the non-magnetic ink while transforming the sheet image.

16. A printing system, comprising:

a color transform system operable to transform a sheet image based on an International Color Consortium ("ICC") profile that corresponds with a magnetic ink and a non-magnetic ink to generate at least a first bitmap for printing the magnetic ink and a second bitmap for printing the non-magnetic ink in accordance with ejecting, from a single printhead, the magnetic ink and the non-magnetic ink; and the single printhead operable to receive the first bitmap and the second bitmap, and to concurrently eject the magnetic ink based on the first bitmap and the non-magnetic ink based on the second bitmap.

17. A method of printing magnetic ink, comprising:

transforming a sheet image based on an International Color Consortium ("ICC") profile that corresponds with a magnetic ink and a non-magnetic ink to generate at least a first bitmap for printing the magnetic ink and a second bitmap for printing the non-magnetic ink in accordance with ejecting, from a single printhead, the magnetic ink and the non-magnetic ink;

receiving the first bitmap and the second bitmap at the single printhead; and ejecting the magnetic ink based on the first bitmap and the non-magnetic ink based on the second bitmap concurrently.

* * * * *